United States Patent Office 2,981,715
Patented Apr. 25, 1961

2,981,715

STABILIZATION OF POLYAMIDES WITH ALKARYL PHOSPHINATES

Victor R. Ben, Wilmington, Del., assignor to E. I. du Pont de Nemours and Company, Wilmington, Del., a corporation of Delaware No Drawing. Filed Oct. 2, 1958, Ser. No. 764,733

24 Claims. (Cl. 260—45.7)

This invention relates to a shaped article produced from a polyamide and to the process for its preparation. More particularly it is concerned with the production of a "yellowing inhibited" shaped article produced from a polyamide.

Shaped articles such as fibers, yarns, filaments, staple, pellicles, molded forms and the like produced from a polyamide are well known. Such materials are commercially known as nylon. Preparation of polymers suitable for use in manufacturing such shaped articles may be prepared according to processes described in United States Patent Nos. 2,071,250; 2,071,253 and 2,130,948. The shaped nylon articles of the prior art suffer from a tendency to yellow, particularly when subjected to high temperatures such as those normally employed in conventional "heat-setting" to obtain increased resilience and improved hand, in the application of resin coatings and the like.

It is the object of the present invention to provide a shaped article produced from a polyamide which resists yellowing.

Another object is to provide a process for the production of a shaped article produced from a polyamide which resists yellowing.

Still another object is to produce an essentially white shaped article produced from a polyamide.

A further object of this invention is to provide a process for the preparation of a polyamide, which is white, resistant to heat yellowing and which shows good processability in spinning and drawing operations.

A still further object of this invention is to provide a process for the preparation of a white nylon yarn resistant to heat yellowing which can be drawn with a low frequency of breaks and wraps.

Other objects will become apparent in the course of the following specification and claims.

These objects are accomplished by the present invention which provides a yellowing inhibited shaped article and a process of preparing a yellowing inhibited shaped article of a polyamide which comprises preparing the polymer by melt polymerization in the presence of a dissolved phosphinate compound of the formula

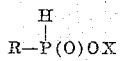

wherein R is a radical selected from the class consisting of alkyl, aryl and aralkyl each with or without functional groups, X is selected from the class consisting of R and metal, and X and R being alkylene when joined to form a ring structure, and forming a shaped article by the solidification of the polymerized melt, with the proviso that where copper and halide salts are present during polymerization the said shaped article is scoured prior to heat setting. In a preferred embodiment of the present invention, the shaped article is scoured prior to heat setting regardless of whether or not copper and halide salts are present during polymerization.

The term "scouring" is used to signify a process whereby the shaped article is contacted with a solvent for the phosphinate compound so that the phosphinate compound is partially or totally extracted from the article. In practice it has been found that water or water containing a small amount of soap or detergent may be employed with good results. Other solvents such as organic solvents or mixtures thereof may likewise be used. The term "heat set" is used in its conventional sense to mean that process whereby the shaped article is subjected to an elevated temprature to cause it to "set" or "shape." Heat setting is generally accomplished by heating the article in air or steam at a temperature of about 180° or higher for a period of about ten minutes. Lower and higher temperatures, however, may be used as may longer or shorter periods of treatment. For example, in some heat-setting techniques, temperatures as low as 90° C. or even lower are employed but generally require longer periods of treatment. In using the preferred process of the present invention, however, the article is "scoured" prior to subjecting it to any such elevated temperature.

In a more preferred embodiment of the present invention, a yellowing inhibited yarn is formed using the sodium salts of a phenylphosphinic acid with mono- or dialkyl substitution in the benzene nucleus of which one alkyl radical is in the 2 or 3 position relative to the phosphinate group. Preferably, the alkyl radicals are either methyl or ethyl. The preferred antioxidants of this invention do not induce spherulitic nucleation in the polymer. A low value of spherulitic nucleation is desired for good processability of the yarn. Properties of the yarn which reflect the lack of nucleation, such as birefringence, and frequency of breaks and wraps in the drawing operation, are essentially unchanged compared to the polymer produced without antioxidant, while the initial whiteness, heat stability and resistance to heat yellowing, properties which do not depend on nucleation, show the desired improvement compared to yarn produced without antioxidant. The group of preferred antioxidants resulting in yarns with superior processability are exemplified by the following compounds:

Sodium o-methylphenylphosphinate
Sodium m-methylphenylphosphinate
Sodium o-ethylphenylphosphinate
Sodium m-ethylphenylphosphinate
Sodium 2,3-dimethylphenylphosphinate
Sodium 2,4-dimethylphenylphosphinate
Sodium 2,5-dimethylphenylphosphinate
Barium 2,5-dimethylphenylphosphinate In accordance with a preferred embodiment of the invention, the additive is partially or totally removed from the article while it is in the yarn or fabric form, by extraction with a solvent prior to subjecting the said yarn to the elevated temperatures of heat setting.

The following examples are cited to illustrate the invention and not intended to limit it in any manner. The effectiveness of the phosphinate compound is tested by one or more of the following procedures:

Test A.—DEGREE OF YELLOWING

The method of L. G. Glasser and D. J. Troy of the Optical Society, vol. 42, page 652 (1952), is employed to determine the degree of yellow within the observed sample. In this procedure, the higher the "+b" value, the greater the initial amount of yellow in the sample. The heat yellowing of the yarn is evaluated by measuring the increase in "+b" value ("Δb" values) after heating 10 minutes in air at 180° C. The higher the "Δb" value, the greater the amount of yellow produced in the sample by heat. The sample of yarn is adapted to the test by cutting the yarn into ¼" flock which is slurried in water and formed into a batt by filtration on a 5 cm. diameter Büchner funnel. The color of the flattened batt is reported as the color of the yarn.

Test B.—ANTIOXIDANT RATING

Polyhexamethylene adipamide containing 0.75 mole percent of the antioxidant to be tested is introduced into a heavy walled polymer tube and the tube is sealed under vacuum and heated for 1 hour at 220° C. and then melted at 282° C. under nitrogen until the rising of bubbles has essentially stopped. After cooling, the polymer is ground to ⅛" flake, passed through a 20 mesh screen, and spread in a thin layer in an aluminum weighing dish, and heated to 180° C. for 10 minutes. The colors of the samples are then assessed numerical values from 1 to 25 by rating against standard colors of master samples. Value 1 corresponds to the essentially white color obtained from a sample which has not been heat treated. Value 25 corresponds to the brown color obtained when a sample not containing an antioxidant is treated as described. The other values correspond to intermediate colors.

Test C.—CAPILLARY QUENCH TEST FOR NUCLEATION

A sample of molten polymer containing the antioxidant is introduced into a glass capillary tube and quenched by plunging the capillary into ice water. The glass is broken away and the polymer examined under the microscope for nucleation. "High," "medium" and "low" nucleation are reported relative to a standard containing no modifier.

Processability of the yarn and drawing performance are evaluated by counting draw twister breaks per pound of yarn and counting draw roll wraps as a percentage of the number of draw twister positions.

Example I

A stainless steel autoclave equipped with a charging lock as described in United States Patent No. 2,278,878 is charged with 467 pounds of an aqueous solution containing 47% by weight hexamethylenediammonium adipate, 5.3 pounds of an aqueous solution containing 20% by weight of sodium phenyl phosphinate (0.53% based on polymer weight) and 2.1 pounds of an aqueous solution containing 25% by weight acetic acid. The autoclave is purged of air, filled with nitrogen and heated until its temperature reaches approximately 240° C. and 250 pounds per square inch pressure. At this stage bleeding off of water vapor is begun. The polymerization cycle is continued as taught in Example I of United States Patent No. 2,163,636. Upon completion of the reaction the molten polymer, having a relative viscosity of 37, is extruded in the form of a ribbon upon a casting wheel. After quenching it is cut into chips suitable for remelting at the grid of a spinning assembly. Such a technique is taught in Example I of United States Patent No. 2,289,774.

The polyhexamethylene adipamide flake obtained as disclosed above is steam spun in the apparatus disclosed in United States Patent No. 2,571,975. The grid and melt pool temperature is maintained at about 290° C. The molten polymer is spun through a 13-hole spinneret, each orifice having a diameter of 0.007 inch. The extruded yarn is collected at a rate of about 1200 yards per minute. It is cold drawn in the apparatus disclosed in United States Patent No. 2,289,232 to produce a yarn having a break elongation of 28±2%. The speed of the pump delivering molten polymer to the spinneret is adjusted to provide a final drawn denier of 40.

The product is observed to have a "+b" rating of 2.2. A comparative control, containing no sodium phenyl phosphinate, has a "+b" rating of 4.2.

A sample of the yarn containing sodium phenyl phosphinate and prepared as described above is heated 20 minutes in air at 180° C. to induce heat yellowing. Its "+b" rating increases to 17.4. The "+b" rating of the sample of the comparative control under the same conditions increases to 19.5.

A sample of the polyamide yarn containing sodium phenyl phosphinate and produced as described above is scoured by agitation for 30 minutes at the boil in water containing 0.1% palm oil soap, 0.1% sodium lauryl sulfate and 0.1% trisodium phosphate. The sample is thereafter rinsed in water. Upon heating for 20 minutes in air at 180° C. the sample is observed to have a "+b" rating of 11.1.

Example II

A polyhexamethylene adipamide yarn containing as additives, based on the weight of the polymer, 0.25% sodium phenyl phosphinate, 0.03% cupric acetate and 1.0% potassium iodide is produced in accordance with the technique described in Example I. The yarn as spun and drawn has a "+b" rating of 5.5. When subjected to the heat yellowing treatment described above, the "+b" rating increases to 14. When the yarn is scoured as taught in Example I subsequent induced heat yellowing increases the "+b" rating to only 10.4.

Examples III and IV

In Examples III and IV the 0.53% sodium phenyl phosphinate of Example I is replaced by 0.50% of hexamethylenediammonium phenyl phosphinate and 0.50% sodium-2-hydroxybutyl-2-phosphinate respectively. Results are listed below:

TABLE I

| Example | "+b" Rating After Scouring | "+b" Rating After Scouring and Heating [1] | "Δb" |
|---|---|---|---|
| III | 2.2 | 9.7 | 7.5 |
| IV | 2.2 | 10.4 | 8.2 |

[1] 180° C. for 20 minutes.

Example V

Sodium 2,5-dimethylphenylphosphinate is prepared as follows: p-xylene is condensed with phosphorus-trichloride in the presence of aluminum chloride according to the procedure of B. Buechner and L. B. Lockhart, Jr. [Journal American Chem. Soc. 73, 755 (1951)], to obtain 2,5-dimethylphenylphosphonous dichloride. The 2,5-dimethylphenylphosphonous dichloride is purified by distillation under reduced pressure. The so purified 2,5-dimethylphenylphosphonous dichloride is hydrolyzed according to the procedure of G. M. Kosolapoff and G. S. Powell [J. Am. Chem. Soc. 72, 4291 (1950)], and the 2,5-dimethylphenylphosphinic acid obtained has a melting point of 29.5 to 91° C. The acid is converted to the sodium salt by dissolving the acid in water and neutralizing with 5% aqueous sodium hydroxide to a pH=7.0 and evaporating the solution to dryness under reduced pressure.

Sodium 2,5-dimethylphenylphosphinate (0.50% by weight, based on polymer) is added to the 6–6 nylon salt solution (47% aqueous hexamethylene diammonium adipate) in the evaporator prior to concentration and polymerization of the salt. The polymerization is conducted as described in Spanagel United States Patent No. 2,163,636.

The polymer is spun following the techniques described in United States Patent No. 2,571,975 and drawn following the techniques described in United States Patent No. 2,289,232. The results are recorded in Table II.

TABLE II

| Initial +b | +b after heating | Δb | Test C |
|---|---|---|---|
| 2.5 | 14.8 | 12.3 | Low. |

When the same yarn is scoured according to the procedure of Example I, the color (+b value) and heat yellowing resistance (Δb value) of the yarn are essentially equal to those of a yarn containing the antioxidant sodium phenylphosphinate and both are superior to a control without antioxidant. The other physical properties and characteristics (break and wrap frequencies, spherulitic structure, cross-sectional appearance, and birefringence) of the yarn containing 2,5-dimethylphenylphosphinate are of the same order as those of the yarn without antioxidant. The properties of the scoured yarns are recorded in Table IIA.

TABLE IIA

| Antioxidant | Conc. (percent by wt.) antioxidant | +b value (initial color) | Δb value (heat yellowing) | Birefringence | Breaks per pound | Wraps, percent |
|---|---|---|---|---|---|---|
| None | 0.00 | 4.2 | 19.7 | 0.020 | 0.01 | 4.2 |
| Sodium 2,5-dimethylphenylphosphinate | 0.50 | 2.2 | 8.5 | 0.022 | 0.02 | 13.2 |
| Sodium phenylphosphinate | 0.50 | 2.2 | 8.9 | 0.012 | 0.53 | 44 |

Three yarns are prepared following the techniques of Example I: the first yarn is a control without antioxidant; the second yarn contains one of the preferred antioxidants (a phenylphosphinate with alkyl substitution in the 2 or 3 position) i.e., sodium 2,5-dimethylphenylphosphinate; the third yarn contains an alkyl substituted phenyl phosphinate within the scope of this invention but outside the preferred group, i.e., sodium 4-methylphenylphosphinate. The physical properties and processing characteristics of the three yarns are compared in Table III.

TABLE III

| Antioxidant | Conc. (percent by wt.) antioxidant | Initial +b | Δb | Breaks per pound | Wraps, (percent |
|---|---|---|---|---|---|
| None | 0.00 | 4.2 | 19.7 | 0.26 | 35 |
| Sodium 2,5-dimethylphenylphosphinate | 0.50 | 2.2 | 8.5 | 0.21 | 27 |
| Sodium p-methylphenylphosphinate | 0.50 | 2.2 | 8.9 | 0.15 | 75 |

The table shows the improvement in Δb value of the two antioxidants within the scope of this invention. It also shows that the antioxidant in the preferred group leaves the percent wraps essentially unchanged.

*Examples VII to LXI*

The following yarns are prepared using the procedure of Example I and other phosphinate compounds having the formula

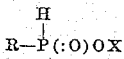

$$R-P(:O)OX$$

as indicated in the table. The amount of the phosphinate compound employed is in each case 0.5% by weight (based on polymer) and the tests used to determine the properties are as indicated. In each example the yarn is scoured using the procedure of Example I prior to measuring the "+b" value. The results of Examples 1, 3, 4, 5 and 6 are repeated for comparison purposes in table form below.

| Ex. No. | Test A Initial +b | Test A +b after heating | Test A Δb | Antioxidant | Test B | Test C |
|---|---|---|---|---|---|---|
| Control (see Ex. I) | 4.2 | 19.7 | 15.5 | No antioxidant (scouring) | 25 | Low. |
| 1 | 2.2 | 11.1 | 8.9 | Sodium phenylphosphinate | 15 | High. |
| 3 | 2.2 | 9.7 | 7.5 | Hexamethylene diammoniumphenylphosphinate | 20 | Low. |
| 4 | 2.2 | 10.4 | 8.2 | Sodium 2-hydroxybutyl-2-phosphinate | 7 | High. |
| 5 | 2.2 | 10.7 | 8.5 | Sodium 2,5-dimethylphenylphosphinate | 14 | Low. |
| 6 | 2.2 | 11.1 | 8.9 | Sodium p-methylphenylphosphinate | 15 | High. |
| 7 | | | | Sodium ethylphosphinate | 9 | High. |
| 8 | 2.2 | 12.2 | 10.0 | Sodium isobutylphosphinate | 12 | High. |
| 9 | | | | Sodium 3-pentylphosphinate | 9 | High. |
| 10 | | | | Sodium cyclopentylphosphinate | | High. |
| 11 | | | | Sodium cyclohexylphosphinate | 12 | High. |
| 12 | 2.2 | 10.4 | 8.2 | Sodium 2-methylcyclohexylphosphinate | | Medium. |
| 13 | | | | Sodium isooctenylphosphinate | | |
| 14 | 2.2 | 10.7 | 8.5 | Sodium isooctylphosphinate | 18 | Low. |
| 15 | 2.2 | 10.7 | 8.5 | Sodium n-octyl-phosphinate | 15 | Low. |
| 16 | | | | Sodium styrylphosphinate | 9 | High. |
| 17 | | | | Disodium 1,6-hexyldiphosphinate | 15 | High. |
| 18 | | | | Sodium 3-hydroxypropylphosphinate | 12 | Low. |
| 19 | 2.2 | 11.5 | 9.3 | Sodium 3-hydroxy-2-methylpropylphosphinate | 10 | |
| 20 | | | | Potassium 3-hydroxy-2-methylpropylphosphinate | | Low. |
| 21 | 2.2 | 10.8 | 8.6 | Potassium 2-hydroxybutyl-2-phosphinate | | |
| 22 | 2.2 | 12.7 | 10.5 | Potassium 1-hydroxy-1-phenethylphosphinate | 14 | Low. |
| 23 | 2.2 | 10.0 | 7.8 | Sodium α-hydroxydiphenylmethylphosphinate | 11 | Low. |
| 24 | 2.2 | 9.5 | 7.3 | Sodium α-(n-butylamino)-isopropylphosphinate | 10 | |
| 25 | | | | Sodium α-(2-phenethylamino)isopropylphosphinate | 10 | |
| 26 | 2.2 | 12.2 | 10.0 | Sodium 1-carboxypropyl-2-phosphinate | 18 | Medium. |
| 27 | | | | Sodium 4-carbomethoxybutylphosphinate | 14 | |
| 28 | | | | Sodium 4-cyanobutylphosphinate | 14 | |
| 29 | 2.2 | 13.1 | 10.9 | Disodium 1,8-diaminooctyl-3,6-diphosphinate | 12 | |
| 30 | | | | Sodium 1,2-dicarboxyethylphosphinate | 16 | |
| 31 | | | | Sodium 1,4-dicarboxybutyl-2-phosphinate | 18 | |
| 32 | | | | Sodium 1,4-dicyanobutyl-2-phosphinate | 16 | |
| 33 | 2.2 | 11.2 | 9.0 | Lithium phenylphosphinate | 16 | High. |
| 34 | 2.2 | 10.2 | 8.0 | Potassium phenylphosphinate | | Medium. |
| 35 | 2.2 | 10.7 | 8.5 | Rubidium phenylphosphinate | | Low. |
| 36 | 2.2 | 11.2 | 9.0 | Cesium phenylphosphinate | 12 | Low. |
| 37 | | | | Magnesium phenylphosphinate | 20 | Low. |
| 38 | | | | Calcium phenylphosphinate | 14 | High. |
| 39 | 2.2 | 13.4 | 11.2 | Barium phenylphosphinate | 12 | High. |
| 40 | 2.2 | 11.7 | 9.5 | Manganous phenylphosphinate | 13 | Low. |
| 41 | 2.2 | 13.2 | 11.0 | Aluminum phenylphosphinate | | High. |
| 42 | | | | Stannous phenylphosphinate | 15 | High. |
| 43 | 2.2 | 13.2 | 11.0 | Stannic phenylphosphinate | 18 | Medium. |
| 44 | 2.2 | 11.1 | 8.9 | Potassium p-dodecylphenylphosphinate | 12 | High. |
| 45 | 2.2 | 9.7 | 7.5 | Sodium p-dimethyl-aminophenylphosphinate | 17 | Low. |
| 46 | 2.2 | 9.2 | 7.0 | Potassium p-dimethyl-aminophenylphosphinate | 12 | Low. |
| 47 | | | | Sodium p-(β-carboxyethyl)phenylphosphinate | 18 | Low. |

| Ex. No. | Test A | | | Antioxidant | Test B | Test C |
|---|---|---|---|---|---|---|
| | Initial +b | +b after heating | Δb | | | |
| 48 | 2.2 | 12.7 | 10.5 | Tetramethylammonium phenylphosphinate | | Low. |
| 49 | | | | 3-Hydroxy-propylphosphinic acid phostone | 12 | Low. |
| 50 | | | | 3-Hydroxy-2-methylpropylphosphinic acid phostone | 12 | |
| 51 | | | | Sodium o-methylphenyl-phosphinate | 15 | Low. |
| 52 | | | | Sodium m-methylphenyl-phosphinate | 15 | Low. |
| 53 | | | | Sodium o-ethylphenylphosphinate | 15 | Low. |
| 54 | | | | Sodium m-ethylphenylphosphinate | 15 | Low. |
| 55 | | | | Sodium 2,3-dimethyl-phenylphosphinate | 14 | Low. |
| 56 | | | | Sodium 2,4-dimethyl-phenylphosphinate | 14 | Low. |
| 57 | | | | Barium 2,5-dimethyl-phenylphosphinate | 13 | Low. |
| 58 | | | | Sodium p-ethylphenyl-phosphinate | 15 | High. |
| 59 | | | | Sodium p-isopropyl-phenylphosphinate | 14 | Medium. |
| 60 | | | | Sodium p-methoxy-phenylphosphinate | 13 | High. |
| 61 | | | | Sodium p-bromophenyl-phosphinate | 16 | Medium. |

As is demonstrated in the above examples it is essential that the phosphinate compound be present during those fabricating processes wherein the temperature of the polymer is near or above its melting point. Such temperatures are experienced in melt polymerization, melt spinning, extrusion, molding and the like. After the article is formed into appropriate shape the phosphinate compound is removed by solvent extraction. As is demonstrated above, those articles from which the phosphinate compound has been extracted (after shaping) have much less tendency to yellow than those in which it is permitted to stay. In yarn formation the extraction may precede or follow the drawing operation. If it is extracted after drawing, the extraction may be carried out before, during or after the yarn is made into a fabric. Generally water, either cold or warm, is a satisfactory extraction solvent. Soaps or any of the anionic, cationic or non-ionic detergents may be employed in the aqueous extracting stream. Other solvents which are non-solvents for polyamides, such as alcohols, ethers, hydrocarbons and the like may be used.

The fabric made from scoured yarn and the scoured fabric made from (unscoured) yarn may be heat set following conventional heat setting techniques. Suitable heat setting conditions are described in Test A, but temperatures as low as about 90° C. are suitable.

The use of any amount of the phosphinate compound adjuvant is observed to inhibit yellowing to some extent. However, it is preferred that at least 0.05%, based on the weight of the polymer, be added and it is generally desirable to add at least about 0.2%. Amounts up to the limit of solubility of the particular phosphinate in a particular polyamide is frequently advantageous. Most of these compounds are not highly soluble in molten polyamides, and the addition of amounts exceeding the limit of solubility is usually not desirable. For sodium 2,5-dimethylphenylphosphinate, the preferred concentration range in polyhexamethylene adipamide is 0.5 to 0.7%. This concentration gives good protection against heat yellowing. Other phosphinate compounds have a different solubility in molten polyhexamethylene adipamide.

Although the invention has been described in terms of its effect in improving the color of yarn, it is obvious that similar results can be obtained upon fabrics, films, bristles, ribbons, artificial straw, horsehair, rods and other extruded or shaped articles likely to be subjected to high temperatures. If such articles are of sufficiently thin cross section, the phosphinate compound can be readily extracted therefrom. The compositions embodying this invention may contain the usual amounts of conventional additives, such as pigments, delusterants, plasticizers, antistatic agents and the like.

The invention broadly applies to linear polyamides whose carbonamide linkages are an integral part of the polymer chain. These include polyamides prepared by reactions of diamines and dicarboxylic acids and polyamides prepared from amino acids.

A valuable class of diamines comprises diamines of the general formula:

$$\text{H—N(R')—R—N(R')—H}$$

wherein R' is alkyl or hydrogen and R is a divalent hydrocarbon radical free from aliphatic unsaturation and a chain length of at least 2 carbon atoms. Especially useful within this group are diamines in which R is $(CH_2)_x$ wherein x is at least 4 and not greater than 10. Another valuable class of diamines comprises diamines of the general formula:

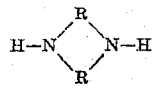

wherein R is defined as above. Especially useful within this class is piperazine.

A valuable class of dicarboxylic acids are the dicarboxylic acids of the general formula:

$$\text{HOOC—R''—COOH}$$

wherein R'' is a divalent hydrocarbon radical free from aliphatic unsaturation with a chain length of at least 3 carbon atoms. Especially useful within this group are the dicarboxylic acids wherein R'' is $(CH_2)_y$ wherein y is at least 3 and not greater than 8.

The polyamides so prepared are polycarbonamides wherein the amide linkages are an integral part of the main polymer chain; they have the repeating units:

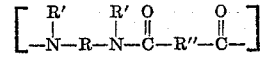

or

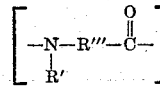

wherein R, R' and R'' are as defined above and R''' is $(CH_2)_z$ and z is a whole number of from 4 to 11.

Among the nylons prepared from amino acids a particularly valuable one for the application of this invention is the one prepared by polymerization of ω-amino caproic acid or its lactam ε-caprolactam.

Many modifications will be apparent to those skilled in the art from a reading of the above without a departure from the inventive concept.

This application is a continuation-in-part of United States application Serial No. 514,390, filed June 9, 1955, and now abandoned.

What is claimed is:

1. A process of preparing a yellowing inhibited polyamide wherein the amide linkage is an integral part of the main polymer chain which comprises preparing the polymer by melt polymerization in the presence of a dissolved phosphinate compound of the formula $$\text{R—P(H)(O)OX}$$

wherein

R is a radical selected from the class consisting of a monovalent aliphatic radical and a monovalent aromatic radical, X is selected from the class consisting of R and metal, and X and R being alkylene when joined to form a ring structure, and forming a shaped article by the solidification of the polymerized melt, with the proviso that where copper and halide salts are present during polymerization the said shaped article is scoured, the scouring taking place after solidification and prior to heat setting.

2. The process of claim 1 wherein the said shaped article is scoured.

3. The process of claim 1 wherein the phosphinate compound is employed in amounts of at least 0.05% based on the weight of the polymer.

4. The process of claim 3 wherein X is sodium and R is an aryl radical of the formula

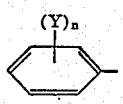

Y being selected from the group consisting of methyl and ethyl and $n$ being a whole number of from 1 to 2.

5. The process of claim 4 wherein Y is methyl.

6. The process of claim 4 wherein Y is ethyl.

7. The process of claim 3 wherein the polyamide is poly(hexamethylene adipamide).

8. The process of claim 3 wherein the phosphinate compound is sodium 2,5-dimethylphenylphosphinate.

9. The process of claim 3 wherein the phosphinate compound is sodium 2,4-dimethylphenylphosphinate.

10. The process of claim 3 wherein the phosphinate compound is sodium o-methylphenylphosphinate.

11. The process of claim 3 wherein the phosphinate compound is sodium m-methylphenyl phosphinate.

12. The process of claim 3 wherein the phosphinate compound is sodium phenylphosphinate.

13. A shaped article prepared by the process of claim 1.

14. The shaped article of claim 13 in the form of a filament.

15. A shaped article prepared by the process of claim 2.

16. The shaped article of claim 15 in the form of a filament.

17. A shaped article prepared by the process of claim 3.

18. The shaped article of claim 17 in the form of a filament.

19. A shaped article prepared by the process of claim 4.

20. The shaped article of claim 19 in the form a filament.

21. A shaped article prepared by the process of claim 5.

22. The shaped article of claim 21 in the form of a filament.

23. A shaped article prepared by the process of claim 6.

24. The shaped article of claim 23 in the form of a filament.

References Cited in the file of this patent

UNITED STATES PATENTS

| 2,510,777 | Gray | June 6, 1950 |
| 2,640,044 | Stamatoff | May 26, 1953 |
| 2,705,277 | Stamatoff | Mar. 29, 1955 |

FOREIGN PATENTS

| 797,038 | Great Britain | June 25, 1958 |

OTHER REFERENCES

Salisbury: Abstract of Serial 120,817, published Jan. 8, 1952, page 1.

Hill: Fibres from Synthetic Polymers, pub. by Elsevier, New York, page 132, August 1953.

UNITED STATES PATENT OFFICE
CERTIFICATE OF CORRECTION

Patent No. 2,981,715                        April 25, 1961

Victor R. Ben

It is hereby certified that error appears in the above numbered patent requiring correction and that the said Letters Patent should read as corrected below.

Column 2, line 15, for "temprature" read -- temperature --; column 4, line 60, for "29.5" read -- 89.5 --; column 5, line 33, after TABLE IIA, in center of column, insert -- EXAMPLE VI --; column 6, TABLE III, heading to last column thereof, for "Wraps, (percent" read -- Wraps, (percent) --; column 10, line 39, list of references cited, under "OTHER REFERENCES", for page 1" read -- 1 page --.

Signed and sealed this 3rd day of October 1961.

(SEAL)
Attest:

ERNEST W. SWIDER
Attesting Officer

DAVID L. LADD
Commissioner of Patents
USCOMM-DC